Oct. 23, 1923.
V. MARTIRE ET AL
1,471,780
AUTOMOBILE BRAKE
Filed Dec. 29, 1922
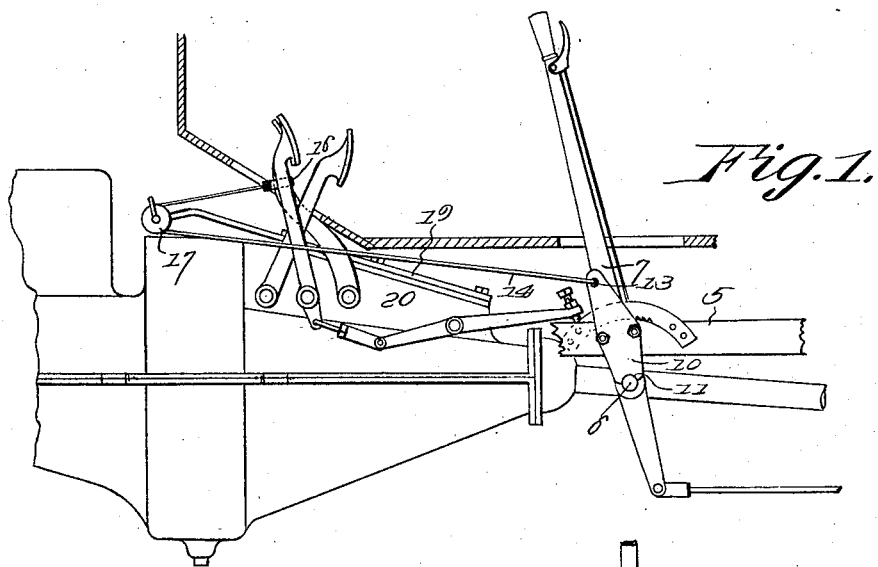
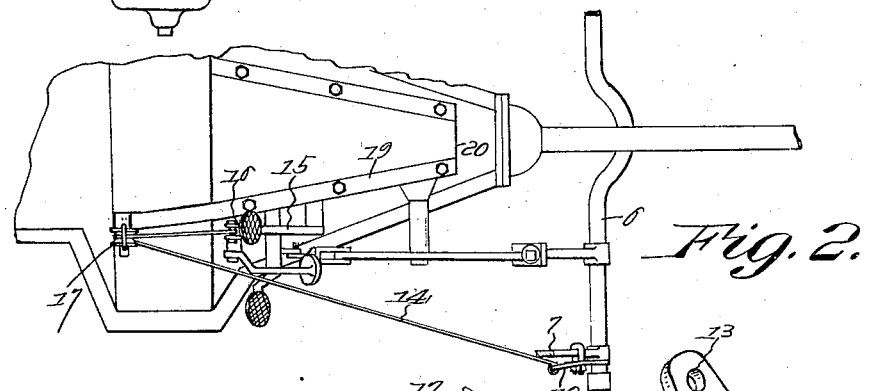
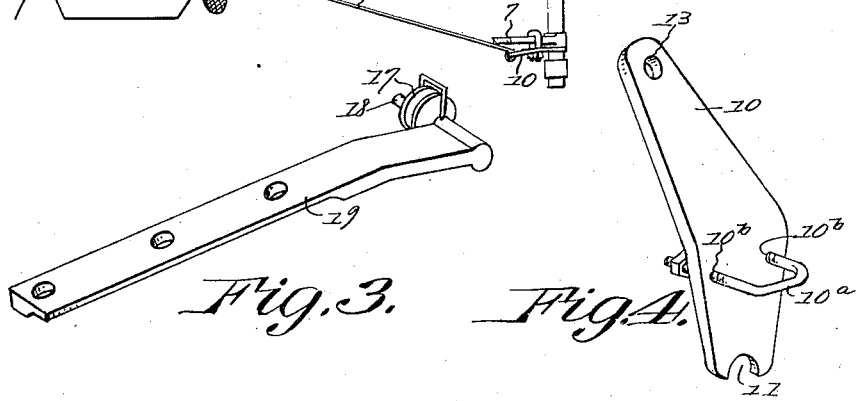 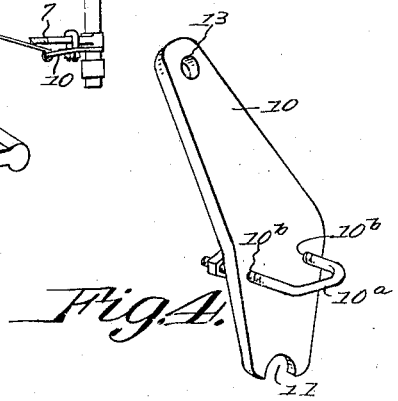

Patented Oct. 23, 1923.

1,471,780

UNITED STATES PATENT OFFICE.

VINCENT MARTIRE, SEBASTIANO DEFRANCISCO, LIBORIO MESSINO, AND NICODEMUS LOMBARDO, OF GLOVERSVILLE, NEW YORK.

AUTOMOBILE BRAKE.

Application filed December 29, 1922. Serial No. 609,641.

*To all whom it may concern:*

Be it known that we, VINCENT MARTIRE, a citizen of the United States of America, and SEBASTINO DEFRANCISCO, LIBORIO MESSINO, and NICODEMUS LOMBARDO, subjects of the King of Italy, all being residents of Gloversville, in the county of Fulton and State of New York, have invented certain new and useful Improvements in Automobile Brakes, of which the following is a specification.

This invention relates to brakes for Ford automobiles, and has for an object the provision of novel means whereby a foot lever may be connected to an emergency brake lever in order that the emergency brake lever will operate the transmission brake lever for applying the brake simultaneously with the operation of the emergency brake lever.

An object of this invention is furthermore to produce an attachment to be associated with the foot lever, and novel means whereby the movement of the emergency brake lever is communicated to the foot lever, the said device including novel means for guiding the connection from the attachment of the foot lever to the emergency brake lever in order that proper operative relation of the parts may be maintained.

It is a further object of this invention to produce an attachment of the character indicated which can be expeditiously installed and which will prove durable and efficient.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views and in which—

Figure 1 illustrates a view in elevation of a fragment of an automobile, showing a device embodying the invention applied thereto;

Figure 2 illustrates a plan view thereof;

Figure 3 illustrates a perspective view of a guiding device for the flexible connection; and Figure 4 illustrates a perspective view of the attachment for the emergency brake.

In these drawings 5 denotes generally a fragment of a chassis of a well known automobile, 6 the brake shaft having the emergency brake lever 7 of usual type.

It is desirable to provide means whereby the transmission brake will be operated simultaneously with the emergency brake, and to that end, provision is made for communicating the motion of the emergency brake lever to the transmission brake.

The present embodiment of the invention for accomplishing the result just stated comprises a plate 10 having a bifurcated end 11 forming a seat or clearance for the brake shaft. The plate has a deflected upper portion with an aperture 13 to receive a flexible conection 14 such as a cable. The cable is connected to the emergency brake lever 15 by a clip 16 of any appropriate type, and the cable is guided over a sheave 17 that is rotatably mounted on a shaft or spindle 18 of the plate 19, which plate may be anchored to the gear case 20, as fully shown in Figs. 1 and 2. The plate 10 is secured to the emergency brake lever by a clip or U-shaped bolt $10^a$ which projects through apertures $10^b$ in the plate, it being understood that the clip embraces the emergency brake lever and serves to retain the plate 10 in operative relation thereto in order that the motion of the emergency brake lever will be imparted to the cable and to the foot brake.

The shaft or spindle 18 extends diagonally with relation to the length of the plate 19 in order that the axis of the sheave will be diagonal with respect to the longitudinal axis of the plate; the purpose being that the cable or flexible member should be free to extend to the side of the chassis, at which point it is connected to the plate 10.

It will be seen from an inspection of the drawing that the plate 10 can be readily applied to emergency brake levers now in common use, and it is adapted for attachment to automobiles as they are at present manufactured by simple expedients that will facilitate its installation.

The mounting for the sheave pulley can be constructed inexpensively by the stamping processes, and the plate which is secured to the foot lever is also of inexpensive construction, and owing to the fact that the device can be expeditiously installed, the costs attending the installation of this attachment will be very small when the advantages are taken into account.

We claim:

The herein described attachment for automobiles, the combination with an emergency brake lever and a transmission brake lever, a brake shaft on which the emergency brake lever is mounted, a plate having a recess in its end forming a seat for the said shaft, means for securing the plate to the emergency brake lever, a flexible member connected to the said plate and to the transmission brake lever, and a guide engaged by the flexible member beyond the transmission brake lever.

SEBASTIANO DEFRANCISCO.
VINCENT MARTIRE.
LIBORIO MESSINO.
NICODEMUS $\overset{\text{his}}{\times}$ LOMBARDO.
$\phantom{NICODEMUS}\,\text{mark}$ Witness as to mark of Nicodemus Lombardo:

JAMES H. WOOD.